United States Patent
Colin

(10) Patent No.: US 10,980,396 B2
(45) Date of Patent: Apr. 20, 2021

(54) DEVICE FOR FIXING A WIPING FELT AND ASSEMBLY INCLUDING THE SAME

(71) Applicant: KRAMPOUZ, Pluguffan (FR)

(72) Inventor: Fabrice Colin, Pouldreuzic (FR)

(73) Assignee: Krampouz

( * ) Notice: Subject to any disclaimer, the term of this patent is extended or adjusted under 35 U.S.C. 154(b) by 64 days.

(21) Appl. No.: 16/391,076

(22) Filed: Apr. 22, 2019

(65) Prior Publication Data
US 2019/0320872 A1    Oct. 24, 2019

(30) Foreign Application Priority Data
Apr. 24, 2018 (FR) ...................... 1853566

(51) Int. Cl.
| A47L 17/08 | (2006.01) |
| B24B 23/04 | (2006.01) |
| B08B 1/00 | (2006.01) |

(52) U.S. Cl.
CPC .............. *A47L 17/08* (2013.01); *B24B 23/04* (2013.01); *B08B 1/006* (2013.01)

(58) Field of Classification Search
CPC .......... A47L 17/08; B24B 23/04; B08B 1/006
See application file for complete search history.

(56) References Cited

U.S. PATENT DOCUMENTS

| 3,224,149 | A | * | 12/1965 | Harrington | .......... | B24D 15/023 |
| | | | | | | 451/518 |
| 7,182,681 | B2 | * | 2/2007 | Kirschhoffer | ........ | B24D 15/023 |
| | | | | | | 451/514 |
| 7,721,372 | B2 | * | 5/2010 | Knopow | ............. | A47L 11/4075 |
| | | | | | | 15/27 |
| 2003/0104777 | A1 | * | 6/2003 | Deshler | .................. | B24D 15/04 |
| | | | | | | 451/514 |
| 2014/0310974 | A1 | * | 10/2014 | Masquin | .................. | A47L 13/14 |
| | | | | | | 34/397 |

FOREIGN PATENT DOCUMENTS

EP    2098331 A1 *   9/2009 ............. B24D 15/00

* cited by examiner

*Primary Examiner* — Michael D Jennings
(74) *Attorney, Agent, or Firm* — Lerner, David, Littenberg, Krumholz & Mentlik, LLP

(57) ABSTRACT

The present invention relates in particular to a device (1) for fixing a felt for wiping the smooth surface of a cooking appliance, such as the surface of a crepe pan, which includes a gripping member (3) opposite which extends an element (5) with flat smooth surface for receiving a wiping felt (2), characterized by the fact that it includes, at the periphery of said element (5) with flat smooth surface, at least one pinching member (6) and that this element (5) with a flat smooth surface (5) and this pinching member (6) are configured to be selectively moved towards or away from each other to pinch, respectively release, said felt (2).

19 Claims, 7 Drawing Sheets

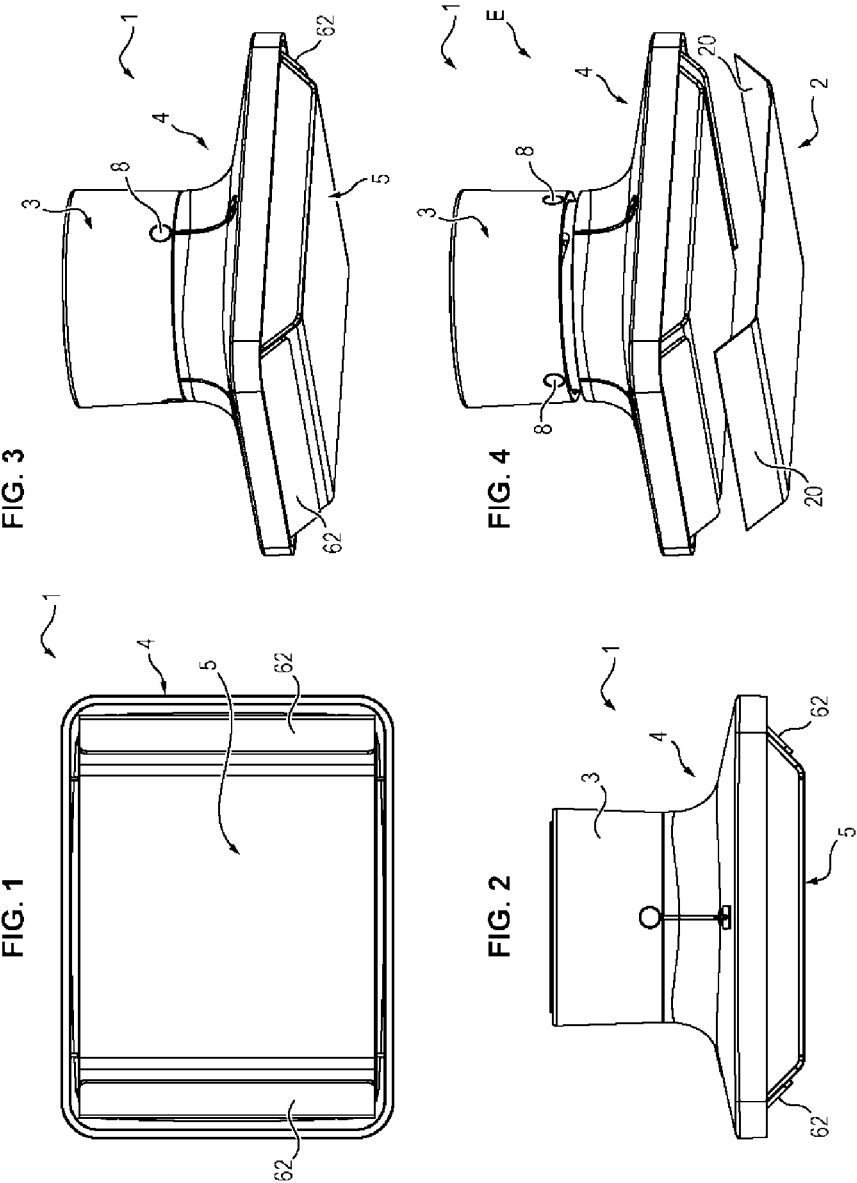

DEVICE FOR FIXING A WIPING FELT AND ASSEMBLY INCLUDING THE SAME

FIELD OF THE INVENTION

The present invention relates to a device for fixing a felt for wiping the smooth surface of a cooking appliance, such as the surface of a crepe pan.

It also relates to a set that includes such a device.

TECHNOLOGICAL BACKGROUND OF THE INVENTION

The present applicant manufactures and markets such cooking appliances, and particularly crepe pans.

For a good use of such apparatus and a better cooking of crepes and pancakes, the necessity of periodically spreading, on the surface of the crepe pan, a small amount of liquid fat such as oil, is well known.

It is also necessary to regularly wipe the cooking plate so as to get rid of food residues that have accumulated thereon.

To this end, the present applicant proposes "pads" that allow applying a small even layer of such a fat. These pads include a gripping member, opposite which extends a surface for receiving a felt, which is regularly soaked with fat.

By the term "felt" is meant throughout the present application, a thin sheet made of a synthetic material configured to retain and release on demand the liquid fat with which it is soaked.

In the case of the aforementioned "pads", the periphery of said surface is provided with a groove in which the contour of the felt is tightly engaged. This operation is not easy to implement because of the relative stiffness of the felt. In addition, it sometimes happens that this felt is unexpectedly partially detached from its support.

In addition, the relative rigidity of this felt is partly due to its significant thickness.

And this causes another problem. Indeed, this pad tends to store the fat with which it is soaked. In other words, it retains more fat than required to treat the entire surface of the crepe pan. As a result, the fat is retained for a relatively long time in the felt, so that it tends to degrade, which is not desirable in terms of food.

Also, there is an unmet need for a device for fixing a felt for wiping the smooth surface of a cooking appliance, such as the surface of a crepe pan, that does not have the aforementioned drawbacks and that allows using a very fine felt that does not store fat and which is of undeniable food quality.

SUMMARY OF THE INVENTION

Thus, the present invention relates to a device for fixing a felt for wiping the smooth surface of a cooking appliance, such as the surface of a crepe pan, which includes a gripping member opposite which extends an element with a flat smooth surface for receiving a wiping felt, which includes at the periphery of said element with a flat smooth surface at least one pinching member and that this element with a flat smooth surface and this pinching member are configured to be selectively moved towards or away from each other to pinch, respectively release, said felt, characterized in that said at least one pinching member is stationary, while said element with a flat smooth surface is movable.

According to other non-limiting and advantageous characteristics of this device, namely:

said gripping member is kinematically connected to said element with a flat smooth surface;

said element with a flat smooth surface comprises a plate constituting said flat smooth surface, which is surrounded by a peripheral wall;

said pinching member includes a central body provided with at least one peripheral flap, this flap and said peripheral wall extending facing one another, parallel or substantially parallel to one another and in the opposite direction;

said pinching member is at least partially covered by a cap in which is formed at least one guide groove forming a cam path, while said gripping member is engaged on said cap, the connection between said pinching member and said element with a flat smooth surface being provided by a stud engaged in said groove;

the fact that said stud is removable;

said device is configured such that said element with a flat smooth surface and said pinching member are selectively moved towards or away from each other through rotation of said gripping member on itself, by a fraction of a turn.

The present invention also relates to an assembly consisting of a device as described above which is equipped with a felt for wiping and retaining a liquid fat.

SHORT DESCRIPTION OF THE DRAWINGS

Other characteristics and advantages of the invention will become apparent upon reading the following description of a preferred embodiment of the invention. This description is made with reference to the appended drawings in which:

FIG. 1 is a bottom view of a possible embodiment of the device according to the invention;

FIG. 2 is a front view of the device of FIG. 1, which is represented in an active working position in which it is equipped with a felt;

FIG. 3 is a perspective view of the device of FIG. 2;

FIG. 4 is a view similar to FIG. 3, the device being shown here in a felt change position;

DETAILED DESCRIPTION OF THE INVENTION

The fixing device 1 represented in the appended figures is mainly formed of plastic material.

It essentially includes a gripping member 3 which overhangs a base 4, which covers elements for fixing a wiping felt 2, seen in particular in FIG. 4.

Figure 5:
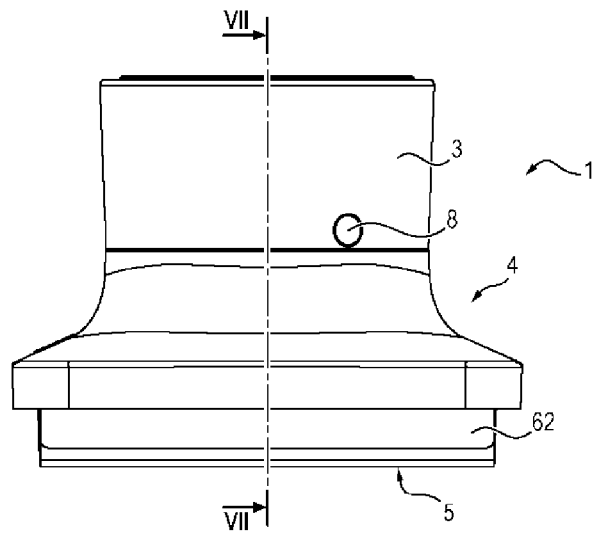
FIGS. 5 and 6 are respectively side and top views of the device of the preceding figures, in active working position.
Figure 6:
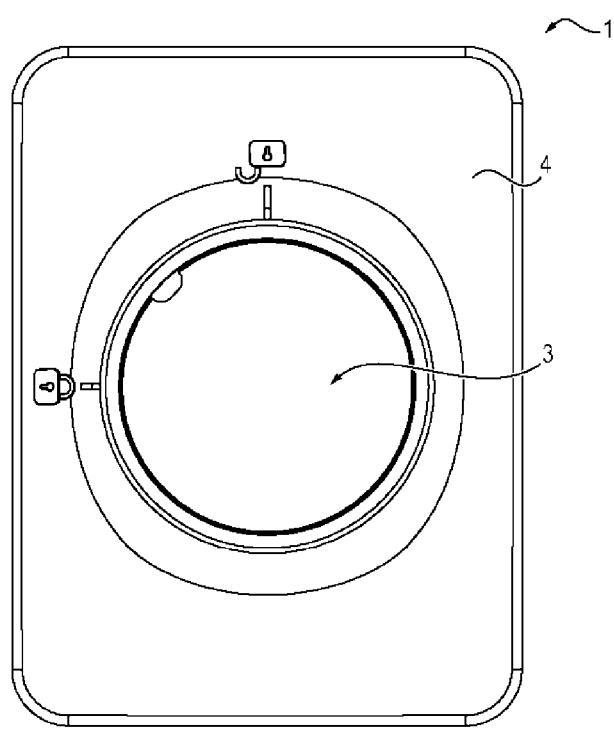
Figure 7:
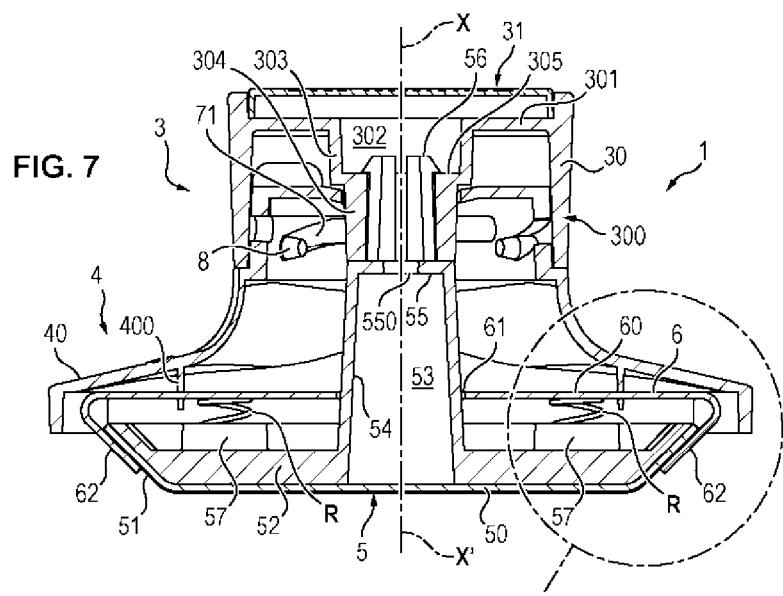
FIG. 7 is a sectional view of said device, according to the sectional plane VII-VII of FIG. 5.
Figure 11:
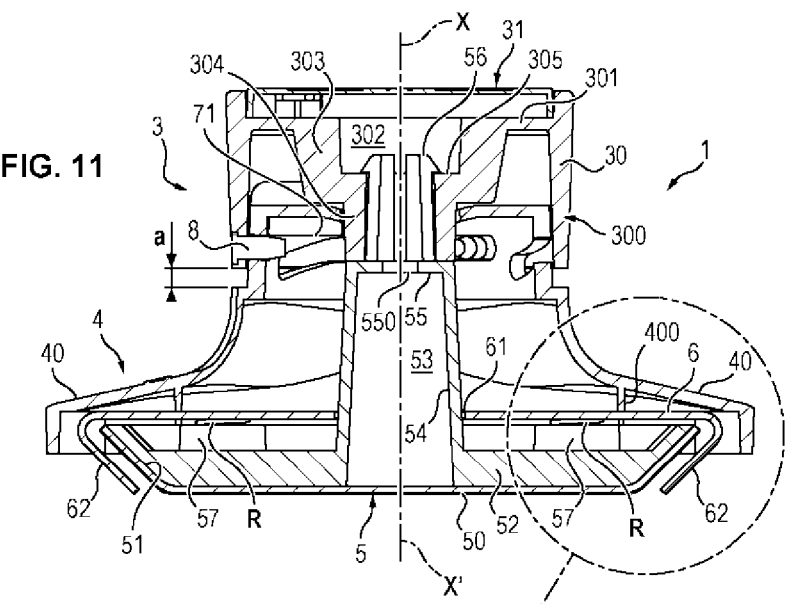

The gripping member 3, which may also be described as handle, has a generally cylindrical shape with an axis of revolution X-X'(see particularly FIGS. 7 and 11).

It consists of a body 30 and receives a removable sealing cap 31 at its upper end.

The body 30 consists of an outer cylindrical element 30 which is open in its lower part and partially closed, not far from its upper end, by a disk-shaped partition 301.

The partition 301 has a circular opening 302 centered on the axis X-X', and this partition continues in the direction of the lower end of the body 30 by two cylindrical portions 303 and 304 of decreasing diameters, these portions being connected to the one another by an annular step 305 parallel to the partition 301. It will be noted that the lowest cylindrical element 304 is of smaller diameter and stops substantially at the lower end of the outer cylindrical element 300.

The base 4 consists essentially of a cap made of plastic material 40 which covers several elements, including an element with a flat smooth surface referenced 5 in the figures. This element 5 is preferably made of metal, such as food-grade stainless steel.

It includes a plate 50 with a smooth surface which, in the exemplary embodiment presented here, is substantially part of a rectangle. This plate is surrounded by a peripheral wall 51, which forms with the upper face of the plate 50, an obtuse angle. In a way, it can be considered that the element 5 has the shape of a hollow container.

The element 5 receives, in the space delimited by the plate 50 and its peripheral wall 51, a part 52 made of plastic material for connection to the aforementioned gripping member 3.

Figure 14:
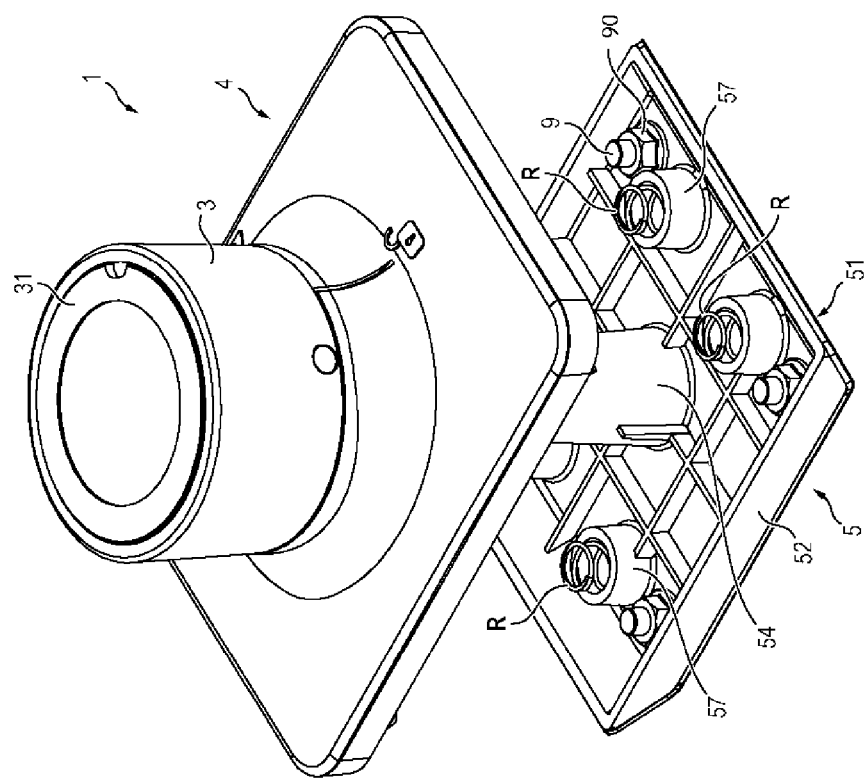
FIG. 14 is a perspective view of the same device, the cap being lifted so as to make visible some parts disposed in its inner space.

For this purpose and as shown in FIG. 14, four gudgeons 9 are welded to the plate 50 and passing through the part 52. Nuts 90 engaged on the gudgeons 9 ensure the fastening of these two elements.

This part 52 has a circular recess 53 of axis X-X' which delimits a slightly frustoconical vertical tubular column 54, whose bottom 55 is pierced with an axial opening 550.

On either side of this opening, and of the upper face of the bottom 55, extend vertically several elastically deformable fingers 56 whose free upper end has a locking tooth shape, as it is well known.

The connection part 52 also includes, on either side of the column 54, vertical wells 57 that each delimit a cavity, each well 57 receiving a helical spring R whose axis is parallel to the axis X-X'.

Each of these springs is trapped, that is to say sandwiched between the connection part 50 and a pinching member referenced 6 in the appended figures.

This pinching member 6 is made of the same metal as the element 5. It has a flat central body 60, substantially of the same size and shape as the element 5. It is pierced by a central opening 61 which allows press-fitting it on the element 5 until it abuts on the column 54, thereby trapping the aforementioned helical springs R.

Moreover, the central body includes two opposite flaps 62. It will be noted that these flaps have the same orientation as the peripheral wall 51 of the element 5. They are therefore parallel and extend in the opposite direction.

Figure 13:
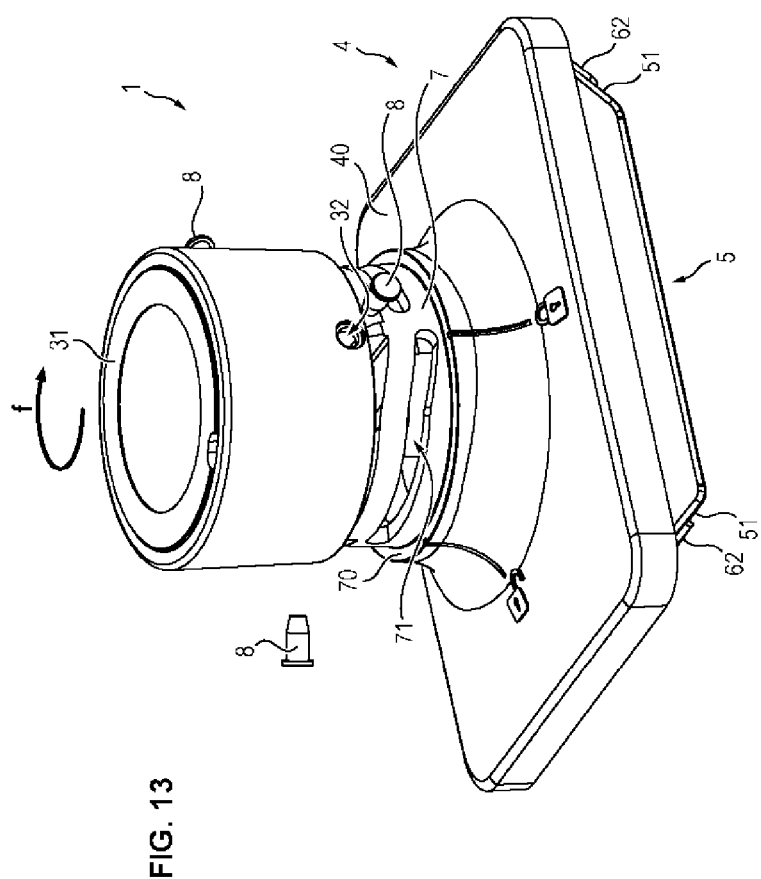
FIG. 13 is a partially exploded perspective view of the device of the preceding figures, intended to show more specifically the means that enable switching it from the working position to the felt changing position.

The pinching member 6 which has just been described is covered by the aforementioned cap 40, as more particularly seen in FIG. 13.

The cap 40 goes back in its central part to form a cylinder 7 for receiving and guiding the gripping member 3.

To this end, it includes a bearing flange 70 and its wall includes three guide grooves 71, which are angularly equidistant in pairs along the periphery of this receiving cylinder 7.

As shown more particularly in FIG. 13, each guide groove 71 includes a long horizontal section, which continues to one end by a downward portion.

The dimensions of the cylinder 7 and of the gripping member 3 are such that it is possible to engage this member 3 on the cap 40 until the member 3 abuts against the bearing flange 70 described above. This engagement is axially made tightly on the elastically deformable fingers 56, until locking the gripping member 3 by their tooth-shaped end which is positioned against the shoulder 305 of the element 3.

Furthermore, this assembly receives three small studs 8 which are positioned in openings 32 provided in the cylindrical element 300 of the element 3 to be engaged inside the aforementioned grooves 71.

The present device finds its utility when used in combination with a wiping felt 2 such as the one represented in the figures. It is for example a felt of known structure, consisting of a very fine fiberglass weft coated with PTFE (polytetrafluoroethylene).

As particularly seen in FIG. 4, such a felt 2 has a shape substantially identical to that of the element 5 with a smooth surface which has been described above and includes in particular two flaps 20 that extend opposite one another.

The establishment of such a felt is made as follows. Before a first use, the device 1 occupies the position visible in particular in FIGS. 1 to 8 and 13. In this position, the element 5 and the pinching member 6 are touching each other and this position is symbolized by the fact that one of the studs 8 described above is positioned vertically to a symbol formed on the base 4 and consisting of the representation of a locked padlock.

Starting from this position, an operator grasps the gripping member 3 and makes it rotate about itself by a fraction of a turn in the clockwise direction (arrow f in FIG. 13).

This forces the studs 8 to move inside the guide grooves, forcing the gripping member 3 to move upwards. As seen in FIG. 11, a small clearance a appears between the lower part of the gripping member 3 and the bearing flange 70 of the cylinder 7.

Insofar as the element 5 is kinematically connected to the gripping member 3, a displacement, also upward, of the element 5 occurs so that the springs R are then compressed between the element 5 and the pinching member 6.

Figure 12:
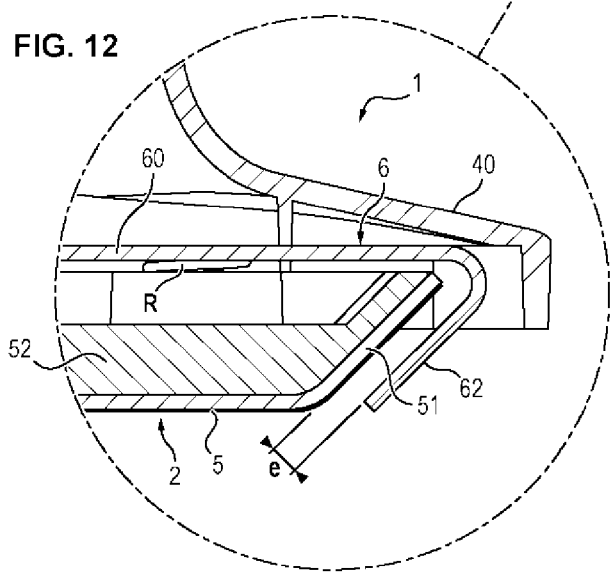

It is then the position illustrated in FIGS. 11 and 12 wherein there is a small clearance e between the peripheral wall 51 of the element 5 and the flaps 62 of the pinching member. This small clearance is sufficient to allow introducing therein the opposite ends 20 of the felt 2.

Figure 8:
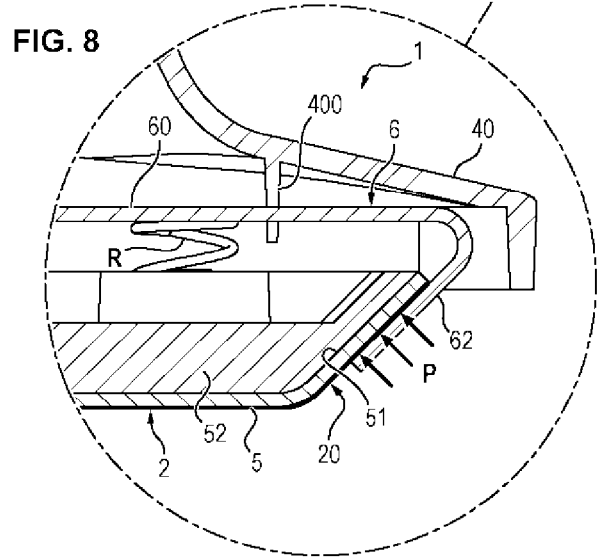
FIG. 8 is an enlarged view of the portion of FIG. 7 indicated by a circle.
Figure 9:
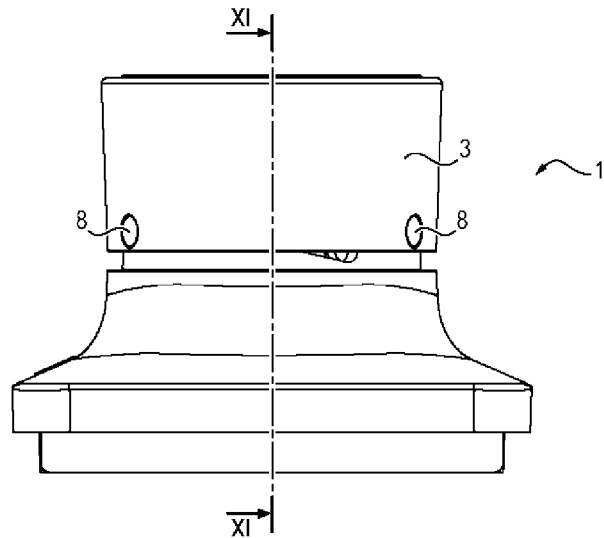
FIGS. 9 to 12 are views respectively similar to FIGS. 6 to 8, the device being represented in the felt changing position of FIG. 4.
Figure 10:
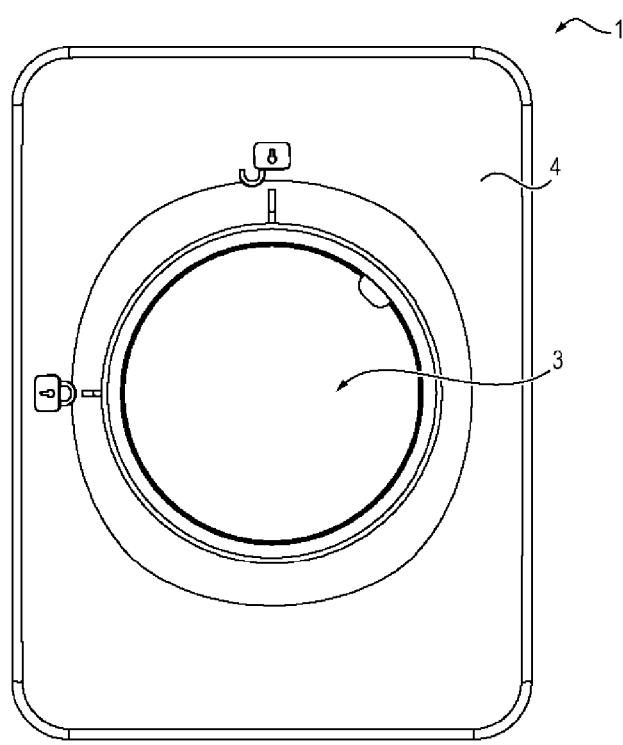

Of course, by a reverse movement of the gripping member 3 vis-à-vis the base 4, there is then a return to the initial position as illustrated in particular in FIG. 7, so that a pinching of the felt 2 occurs as shown by the arrows P in FIG. 8.

The device according to the invention can then be used by being grasping by the gripping member 3, for the wiping of a cooking plate such as that of a crepe pan.

When the felt has been sufficiently used and must be changed in particular for hygienic reasons, it is sufficient to proceed as explained above so as to allow the spacing of the element 5 vis-à-vis the member 6.

The invention claimed is:

1. A device, comprising:
   a gripping member;

an element extending from the gripping member, said element having a flat surface for receiving a felt; and at least one pinching member at a periphery of said element, wherein said element and said pinching member are configured to be selectively moved towards or away from each other through rotation of said gripping member to pinch, or respectively release, said felt, wherein said at least one pinching member is stationary while said element is movable.

2. The device according to claim 1, wherein said gripping member is kinematically connected to said element.

3. The device according to claim 1, wherein said element comprises a plate constituting said flat surface, which is surrounded by a peripheral wall.

4. The device according to claim 3, wherein said pinching member includes a central body provided with at least one peripheral flap, said flap and said peripheral wall extending facing one another, parallel or substantially parallel to each other and in the opposite direction.

5. The device according to claim 4, wherein said pinching member is at least partially covered by a cap, wherein at least one guide groove forming a cam path is formed in the cap, and wherein, when said gripping member is engaged on said cap, the connection between said pinching member and said element is provided by a stud engaged in said groove.

6. The device according to claim 5, wherein said stud is removable.

7. The device according to claim 1, wherein said device is configured such that said element and said pinching member are selectively moved towards or away from each other through rotation of said gripping member on itself, by a fraction of a turn.

8. The device according to claim 1 further comprising a felt for wiping and retaining a liquid fat.

9. The assembly of claim 8, wherein said gripping member is kinematically connected to said element.

10. The assembly of claim 8, wherein said element comprises a plate constituting said flat surface, which is surrounded by a peripheral wall.

11. The assembly of claim 10, wherein said pinching member includes a central body provided with at least one peripheral flap, said flap and said peripheral wall extending facing one another, parallel or substantially parallel to each other and in the opposite direction.

12. The assembly of claim 11, wherein said pinching member is at least partially covered by a cap, wherein at least one guide groove forming a cam path is formed in the cap, and wherein, when said gripping member is engaged on said cap, the connection between said pinching member and said element is provided by a stud engaged in said groove.

13. The assembly of claim 12, wherein said stud is removable.

14. The assembly of claim 8, wherein said device is configured such that said element and said pinching member are selectively moved towards or away from each other through rotation of said gripping member on itself, by a fraction of a turn.

15. A device, comprising:

a gripping member;

an element extending from the gripping member, said element having a flat surface for receiving a felt, said element includes a plate constituting said flat surface, wherein the plate is surrounded by a peripheral wall; and at least one pinching member at a periphery of said element, wherein said element and said pinching member are configured to be selectively moved towards or away from each other to pinch, or respectively release, said felt, wherein said at least one pinching member is stationary while said element is movable, wherein said pinching member includes a central body provided with at least one peripheral flap, said peripheral flap and said peripheral wall extending facing one another, parallel or substantially parallel to each other and in the opposite direction.

16. The device according to claim 15, wherein said gripping member is kinematically connected to said element.

17. The device according to claim 15, wherein said pinching member is at least partially covered by a cap, wherein at least one guide groove forming a cam path is formed in the cap, and wherein, when said gripping member is engaged on said cap, the connection between said pinching member and said element is provided by a stud engaged in said groove.

18. The device according to claim 17, wherein said stud is removable.

19. The device according to claim 15, wherein said device is configured such that said element and said pinching member are selectively moved towards or away from each other through rotation of said gripping member on itself, by a fraction of a turn.

\* \* \* \* \*